(12) United States Patent
McGill (10) Patent No.: US 10,889,148 B1
(45) Date of Patent: Jan. 12, 2021

(54) AIRLESS TIRE

(71) Applicant: John McGill, New Braunfels, TX (US)

(72) Inventor: John McGill, New Braunfels, TX (US)

( * ) Notice: Subject to any disclaimer, the term of this patent is extended or adjusted under 35 U.S.C. 154(b) by 0 days.

(21) Appl. No.: 16/504,243

(22) Filed: Jul. 6, 2019

(51) Int. Cl.
| | |
|---|---|
| *B60B 9/10* | (2006.01) |
| *B60C 7/10* | (2006.01) |
| *B60B 9/00* | (2006.01) |
| *B60C 7/14* | (2006.01) |
| *B60B 1/06* | (2006.01) |
| *B60B 3/00* | (2006.01) |
| *B60B 19/00* | (2006.01) |
| *B60B 3/12* | (2006.01) |

(52) U.S. Cl.
CPC .............. *B60C 7/102* (2013.01); *B60B 9/10* (2013.01); *B60C 7/10* (2013.01); *B60B 1/06* (2013.01); *B60B 3/00* (2013.01); *B60B 3/12* (2013.01); *B60B 9/00* (2013.01); *B60B 19/00* (2013.01); *B60B 2360/10* (2013.01); *B60B 2360/30* (2013.01); *B60B 2900/313* (2013.01); *B60C 7/14* (2013.01); *B60C 2007/146* (2013.01)

(58) Field of Classification Search
CPC ......... B60B 9/10; B60B 15/021; B60B 7/102; B60B 7/10; B60C 5/24; B60C 2007/146
See application file for complete search history.

(56) References Cited

U.S. PATENT DOCUMENTS

| | | | | |
|---|---|---|---|---|
| 686,126 | A * | 11/1901 | Pilkington | B29D 30/02 152/323 |
| 1,938,603 | A * | 12/1933 | McKnight | B60C 7/24 152/306 |
| 2,172,165 | A * | 9/1939 | Lang | B60B 9/10 152/2 |
| 3,630,257 | A * | 12/1971 | Goldberger | B60C 11/11 152/301 |
| 6,374,887 | B1 * | 4/2002 | Subotics | B60C 7/12 152/270 |
| 7,143,797 | B2 * | 12/2006 | Vannan | B60C 7/10 152/7 |
| 9,975,386 | B2 * | 5/2018 | Endo | B60C 5/18 |
| 10,131,183 | B2 * | 11/2018 | Nesnas | B60B 15/02 |
| 2016/0096400 | A1 | 4/2016 | Nomura et al. | |

FOREIGN PATENT DOCUMENTS

JP S6130402 B2 * 7/1986 ............... B60C 7/12

* cited by examiner

*Primary Examiner* — Scott A Browne (57) ABSTRACT

The present invention is directed to airless tires. Exemplary airless tires include a hub configured for attachment to an axle and includes a hub support extending away from the hub. Such exemplary airless tires also include a heel configured around the hub and connected at a distal end of the hub support, whereby the heel includes an elastomer base oriented in a ring around a circumference of the hub support. Such exemplary airless tires also include elastomeric tubes extending radially outward from the heel. Other exemplary airless tires include a centerless hub assembly configured for attachment to an axle and a heel configured around the centerless hub assembly. The heel in such exemplary airless tires includes an elastomer base oriented in a ring around a circumference of the centerless hub assembly. These other exemplary airless tires include elastomeric tubes extending radially outward from the heel.

10 Claims, 7 Drawing Sheets

AIRLESS TIRE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

The present disclosure relates generally to airless tires.

DISCUSSION OF RELATED ART

For many years, the predominate type of tire used on automobiles, trucks, tractors, airplanes, and other vehicles makes use of internal air pressure to carry various loads. These air-filled tires provide a buffering function by absorbing shock which can occur while the vehicle travels over a particular surface, and the internal air pressure operates to maintain a proper shape of the tire so as not to cause the tire to fail when driving the vehicle under such pressure and impact.

The most significant problem of air-filled tires occurs when the tire is punctured in such a way that a hole is punched through the tire into the air-filled space of the pneumatic tire and causes the air-filled space to malfunction. Such puncturing prevents the vehicle from driving properly and often results in a traffic accidents.

Some pneumatic tires are designed to operate across limited distances when the internal air pressure required during normal operation drops due to a puncture. Such pneumatic tires are often referred to as 'run-flat' tires and may continue to be operated for a short distance of 50 to 100 miles without air. When operating in this mode without air pressure, these run-flat tires can heat up by more than one-hundred fifty degrees Fahrenheit above the ambient air temperature. The heat buildup is usually the limiting factor in the durability of these run-flat tires.

In order to solve the puncturing problems associated with air-filled tires, various airless tires have been under development in recent years and various forms of conventional airless tires have been suggested. One of the major shortcomings of conventional airless tires is the difficulty in achieving the same level of the shock absorption as conventional pneumatic tires while providing immunity to the puncturing phenomenon.

The embodiments of the present invention overcome these prior art shortcomings.

SUMMARY OF THE DISCLOSURE

To overcome the limitations found in the prior art, and to minimize other limitations that will be apparent upon the reading of the specification, the present invention is an airless tire as described in these embodiments of the present invention.

Some exemplary airless tires include a hub configured for attachment to an axle and a hub support extending away from the hub. Such airless tires include a heel configured around the hub and connected at a distal end of the hub support. The hub support in such airless tires may spokes, discs, or braces. The heel in such airless tires includes an elastomer base oriented in a ring around a circumference of the hub support. Such airless tires include a plurality of elastomeric tubes extending radially outward from the heel.

In some airless tires, the heel may include a heel brace embedded in the elastomer base. In other airless tires, the heel may include a metal support arch embedded in the elastomer base. In some airless tires, the elastomeric tubes may be solid tubes, and in other airless tires, the elastomeric tubes may be hollow tubes. Still further, in some airless tires, a portion of the elastomeric tubes may be submerged in the elastomer base.

Still other airless tires may include a heel that has a heel brace embedded in the elastomer base. In such other airless tires, the elastomeric tubes may be connected to the heel brace.

Some airless tires may be centerless. Such airless centerless tires may include a centerless hub assembly configured for attachment to an axle. Those airless centerless tires may include a heel configured around the centerless hub assembly. The heel may include an elastomer base oriented in a ring around a circumference of the centerless hub assembly. Such airless centerless tires may include a elastomeric tubes extending radially outward from the heel.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE PREFERRED EMBODIMENT

In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawing which does not limit the scope and the ambit of the invention.

As used herein, the singular forms "a", "an" and "the" include plural referents unless the context clearly dictates otherwise. "And" as used herein is interchangeably used with "or" unless expressly stated otherwise. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
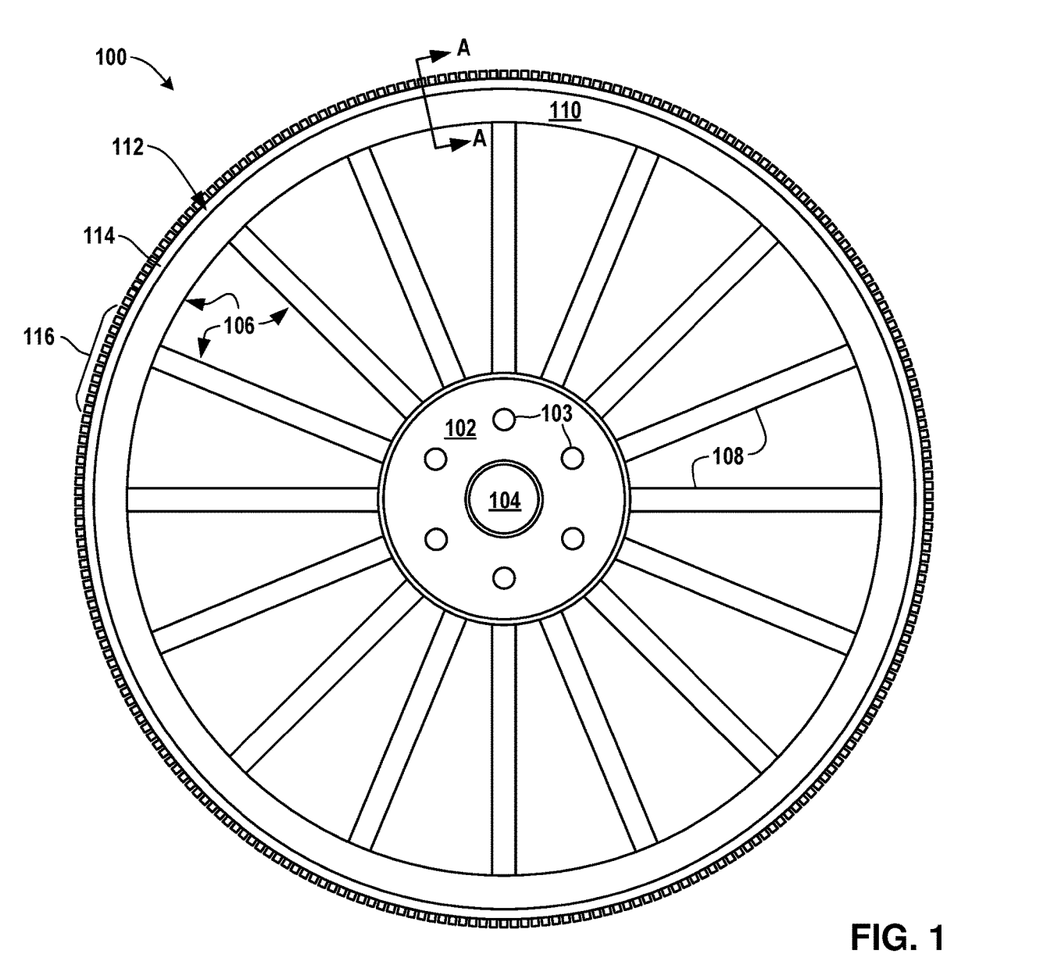
FIG. 1 sets forth a side view of an airless tire according to embodiments of the present invention.

FIG. 1 sets forth a side view of an airless tire 100 according to embodiments of the present invention. The airless tire 100 of FIG. 1 attaches to an axle 104 of a vehicle via a hub 102. The hub 102 is the center of the tire 100 in the example of FIG. 1 and is configured for attachment to an axle 104 via tightening lugs onto axle bolts passing through the lug bolt holes 103. The hub 102 of FIG. 1 is made of metal, but those of skill in the art will recognize other suitable materials from which a hub useful in embodiments of the present invention may be made, including but not limited to carbon-fiber material, fiberglass, wood, and so on.

The airless tire 100 in the example of FIG. 1 also includes a hub support 106 extending away from the hub 102. The hub support 106 of FIG. 1 is the structure that keeps the hub 106 centered with respect to the outer tread of the airless tire 100 as the tire 100 rotates during use. In FIG. 1, the hub support 106 is implemented as a set of spokes 108 and a rim 110. A spoke is a rod extending away from the center of a tire—the hub where the axle connects—connecting the hub with the round traction assembly. There are various kinds of spokes useful in embodiments of the present invention, including but not limited to, the compression spokes, tension spokes, removable spokes, fixed spokes, wire spokes, and so on. In the example of FIG. 1, the spokes extend radially away from the hub 102, but those of skill in the art will recognize that spokes may also extend tangentially away from the hub 102. In fact, such tangential spoking may allow for more efficient transfer of torque between the hub 102 and the traction surface.

In the example of FIG. 1, the rim 110 is an interface between the spokes 108 and the traction surface or tread. Although in FIG. 1, the rim 110 is implemented as part of the hub support 106, in other embodiments, a rim may be a component of the tread assembly. The spokes 108 and rim 110 of FIG. 1 are made of metal, but those of skill in the art will recognize other suitable materials from which a hub useful in embodiments of the present invention may be made, including but not limited to carbon-fiber material, fiberglass, wood, and so on.

In FIG. 1, the airless tire 100 also includes a heel 112 configured around the hub 102 and connected at a distal end of the hub support 106 opposite that of the hub 102. The heel 112 of FIG. 1 is part of the tread assembly for the airless tire 100 and provides a base for the tread surface. The heel 112 of FIG. 1 includes an elastomer base 114 oriented in a ring around a circumference of the hub support 106. An elastomer is a polymer with elastic properties (i.e., viscoelasticity and very weak intermolecular forces). The elastomer base 114 of FIG. 1 is composed of vulcanized rubber. One of ordinary skill in the art will recognize that there are useful alternatives to forming the elastomer base from vulcanized rubber such as, for example, thermoplastic elastomers, silicon, melt-processible rubber, and so on.

In FIG. 1, the airless tire 100 also includes elastomeric tubes 116 extending radially outward from the heel 112. The elastomeric tubes 116 of FIG. 1 are tubular structures formed from an elastomer. Elastomeric tubes utilized in embodiments of the present invention may be solid structures or hollowed out structures and may be formed with a variety of cross-sections. For example, but not limitation, the cross-sections may be circular, oval, square, rectangular, triangular, and so on.

Figure 2:
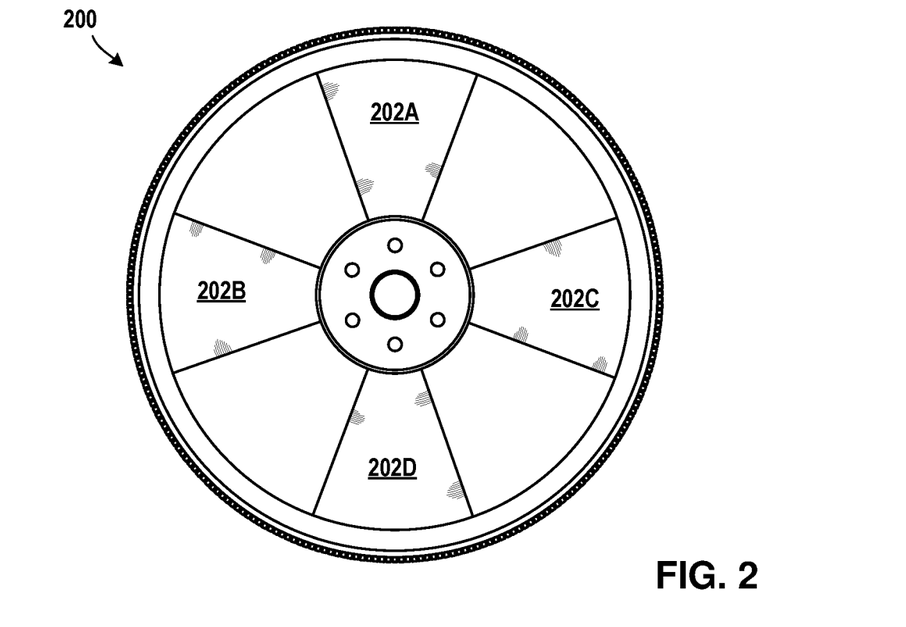
FIG. 2 sets forth a side view of an airless tire according to embodiments of the present invention whereby the hub support is implemented as braces.

As described above, the airless tire 100 of FIG. 1 implements hub support 106 as spokes. Those of skill in the art will recognize, however, that hub supports useful in embodiments of the present invention may be implemented with other structures. FIG. 2 sets forth a side view of an airless tire 200 according to embodiments of the present invention whereby the hub support is implemented as braces 202A-D. Other than the hub support being implemented as braces 202A-D, the airless tire 200 of FIG. 2 is similar in structure to the airless tire 100 of FIG. 1. That is, the airless tire 200 of FIG. 2 includes a hub configured for attachment to an axle and a hub support extending away from the hub. The airless tire 200 of FIG. 2 includes a heel configured around the hub and connected at a distal end of the hub support. In the example of FIG. 2, the heel has an elastomer base oriented in a ring around a circumference of the hub support, and the airless tire 200 of FIG. 2 includes elastomeric tubes extending radially outward from the heel.

Each brace 202A-D of FIG. 2 is shaped as a fin or a portion of an arc. Such an implementation, however, is for example only and not for limitation. Each brace 202A-D of FIG. 2 is a support structure extending away from the tire hub where the axle connects and holds the traction assembly in place relative to the hub. A brace may be implemented as a fin, spoke, lattice, mesh, disc, or other structure as will occur to those of skill in the art.

Figure 3:
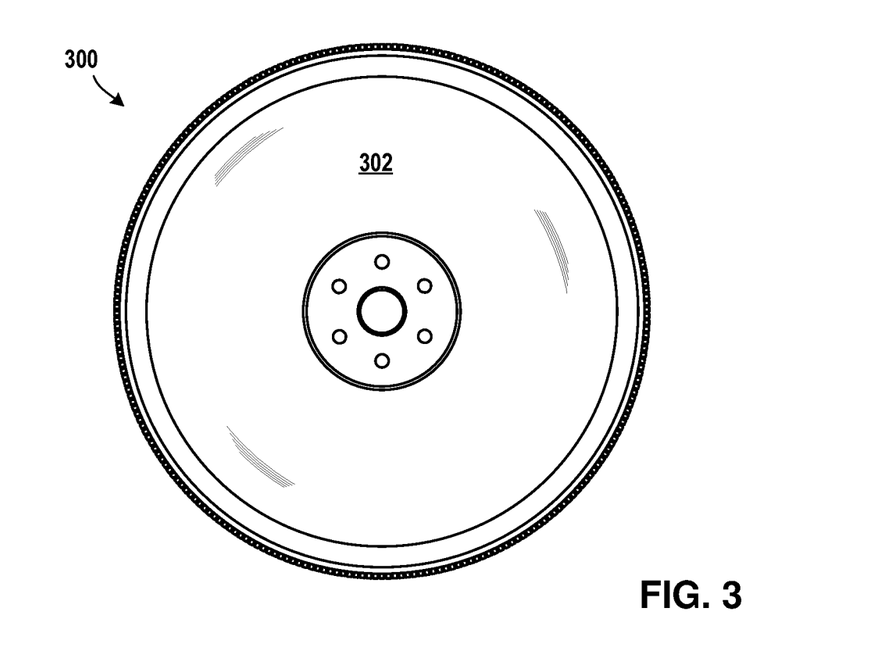
FIG. 3 sets forth a side view of an airless tire according to embodiments of the present invention whereby the hub support is implemented as a disc.

FIG. 3 sets forth a side view of an airless tire 300 according to embodiments of the present invention whereby the hub support is implemented as a disc 302. Other than the hub support being implemented as disc 302, the airless tire 300 of FIG. 3 is similar in structure to the airless tire 100 of FIG. 1. That is, the airless tire 300 of FIG. 3 includes a hub configured for attachment to an axle and a hub support extending away from the hub. The airless tire 300 of FIG. 3 includes a heel configured around the hub and connected at a distal end of the hub support. In the example of FIG. 3, the heel has an elastomer base oriented in a ring around a circumference of the hub support, and the airless tire 300 of FIG. 3 includes elastomeric tubes extending radially outward from the heel.

The disc 302 of FIG. 3 is a circular structure that extends away from the tire hub where the axle connects and holds the traction assembly in place relative to the hub. The disc 302 of FIG. 3 may be implemented as a solid circular structure or may have various slots or holes for stylistic, performance or structural enhancement.

Figure 4:
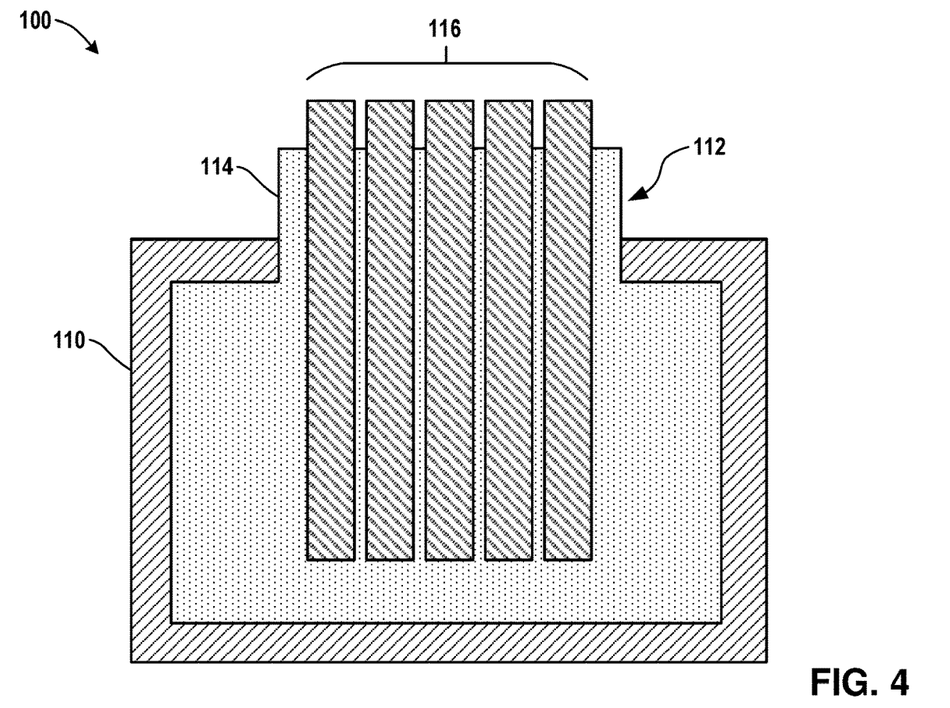
FIG. 4 sets forth the cross-sectional view A-A for the airless tire as shown on FIG. 1 according to embodiments of the present invention.

FIG. 4 sets forth the cross-sectional view A-A for the airless tire 100 as shown on FIG. 1 according to embodiments of the present invention. FIG. 4 depicts the rim 110 encasing the heel 112, which in FIG. 4 is implemented as the elastomer base 114. The elastomeric tubes 116 of FIG. 4 are submerged in the elastomer base 114 with a portion of the elastomeric tubes 116 protruding from the top of the elastomeric base 114.

The length that the elastomeric tubes 116 protrude from the top of the elastomeric base 114 in the example of FIG. 4 will depend on a variety of performance factors. The longer that the elastomeric tubes 116 protrude from the top of the elastomeric base 114, then the more road shock the tire can absorb, the smoother the ride for cargo or passengers, the more the tire grips the road surface—but at the same time, the coefficient of friction between the tire and road surface increases resulting in more heat during performance and more energy required to rotate the tire. So these factors have to be balanced for different applications. For many applications, however, allowing the elastomeric tubes 116 to protrude from the top of the elastomeric base 114 between one-half of an inch to one inch would be suitable.

In the example of FIG. 4, the elastomeric tubes 116 are implemented using solid reinforced hose rubber vulcanized with the elastomer base 114. Of course, those of ordinary skill in the art will recognize other ways of protruding elastomeric tubes from an elastomer base useful in embodiments of the present invention.

Figure 5:
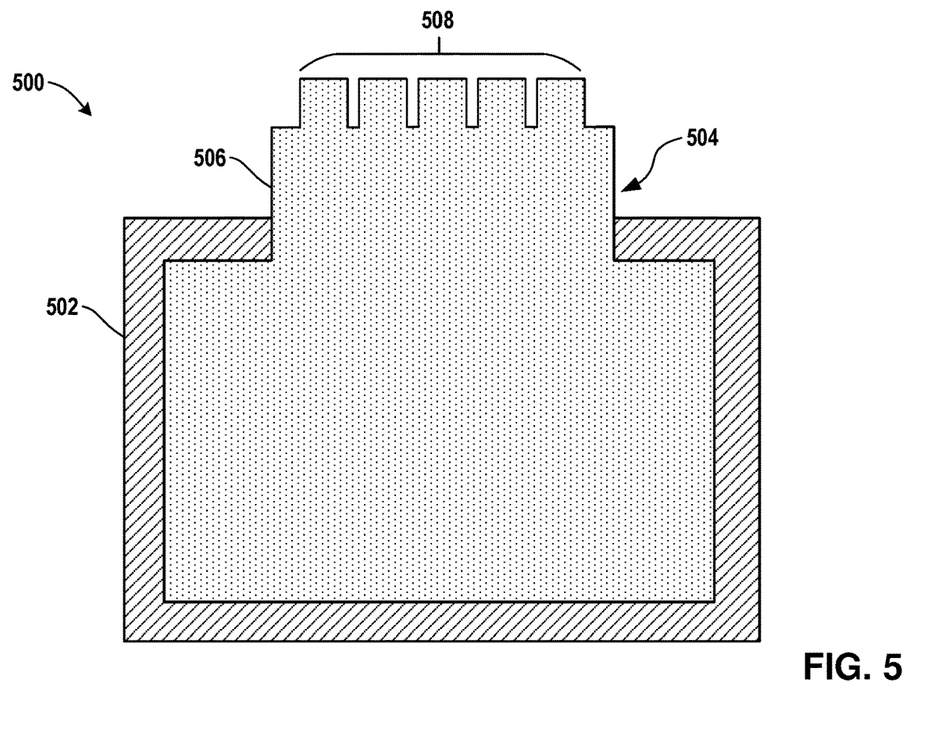
FIG. 5 sets forth the cross-sectional view similar to FIG. 4 for another exemplary airless tire according to embodiments of the present invention.

FIG. 5 sets forth the cross-sectional view similar to FIG. 4 for another exemplary airless tire 500 according to embodiments of the present invention. As in FIG. 4, FIG. 5 depicts a rim 502 encasing the heel 504, which in FIG. 5 is also implemented as the elastomer base 506. The elastomeric tubes 508 of FIG. 5 are form molded along with the elastomer base 506 with the elastomeric tubes 508 protruding from the top of the elastomer base 506. That is, the elastomeric tubes 508 of FIG. 5 and the elastomer base 506 are formed together as a solid piece of vulcanized rubber. Forming the elastomeric tubes 508 of FIG. 5 in this manner may be more cost effective than the structure depicted in FIG. 4, which would make the structure of FIG. 5 more suitable for cost-sensitive applications.

Figure 6:
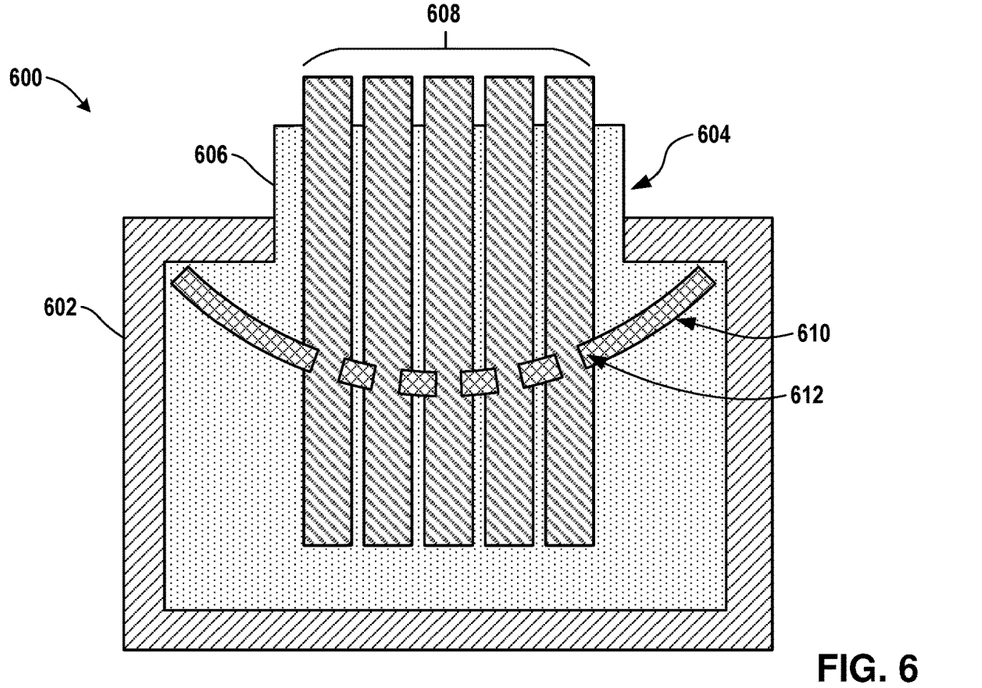
FIG. 6 sets forth the cross-sectional view similar to FIG. 4 for another exemplary airless tire according to embodiments of the present invention.

FIG. 6 sets forth the cross-sectional view similar to FIG. 4 for another exemplary airless tire 600 according to embodiments of the present invention. As in FIG. 4, FIG. 6 depicts a rim 602 encasing the heel 604, which in FIG. 6 also includes an elastomer base 606. The elastomeric tubes 608 of FIG. 6 are submerged in the elastomer base 606 with a portion of the elastomeric tubes 608 protruding from the top of the elastomeric base 606.

In the example of FIG. 6, however, the heel 604 also includes a metal support arch 610. The metal support arch 610 of FIG. 6 is a ring of metal embedded in the elastomer base 606 and having a cross section of an arch as shown in FIG. 6. The metal support arch 610 of FIG. 6 provides additional structural support for elastomer base 606 of the heel 604 when the tread assembly—elastomer base 606 and elastomeric tubes 608 make contact with a road surface and are subject to deformation forces. In the example of FIG. 6, the metal support arch 610 may be additionally connected to the rim 602 to provide structural strength to the rim 602.

A metal support arch useful in embodiments of the present invention may be implemented using a variety of structures. For example, it may be slotted or have holes to allow the elastomer base above and below the metal support arch to have structural continuity. Additionally, a metal support arch useful in embodiments of the present invention may contain corrugation or other enhancements for additional structural strength.

In the example of FIG. 6, the metal support arch 610 contains holes for the elastomeric tubes 608 to pass through and corresponding notches 612 in the elastomeric tubes 608 to provide additional structural support for holding the elastomeric tubes 608 in place. When constructing the tread assembly—which in FIG. 6 includes the elastomer base 606, the elastomeric tubs 608, and the metal arch support 610—the elastomeric tubes 608 may be configured in the metal arch support 610 and then the elastomer base 606 may be injected in and around the tubes 608 and the arch support 610 and vulcanized.

Figure 7:
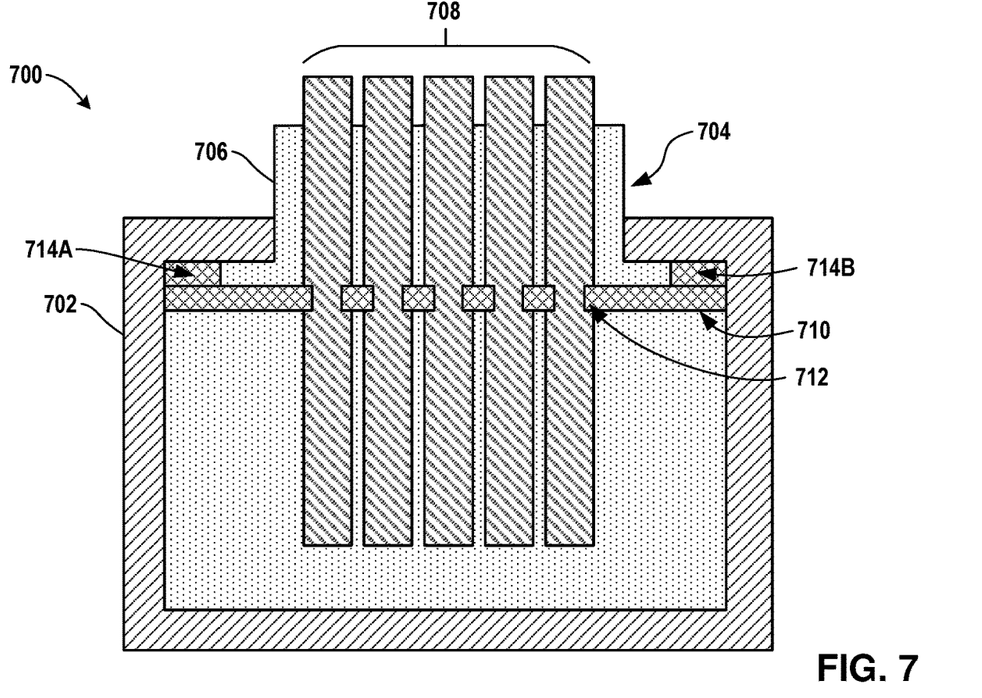
FIG. 7 sets forth the cross-sectional view similar to FIG. 4 for another exemplary airless tire according to embodiments of the present invention.

FIG. 7 sets forth the cross-sectional view similar to FIG. 4 for another exemplary airless tire 700 according to embodiments of the present invention. As in FIG. 4, FIG. 7 depicts a rim 702 encasing the heel 704, which in FIG. 7 also includes an elastomer base 706. The elastomeric tubes 708 of FIG. 7 are submerged in the elastomer base 706 with a portion of the elastomeric tubes 708 protruding from the top of the elastomeric base 706.

In the example of FIG. 7, the heel 704 also includes a heel brace 710. The heel brace 710 of FIG. 7 is a ring of metal embedded in the elastomer base 706 and having a cross section of a bar as shown in FIG. 7. The heel brace 710 of FIG. 7 provides additional structural support for elastomer base 706 of the heel 704 when the tread assembly—elastomer base 706 and elastomeric tubes 708 make contact with a road surface and are subject to deformation forces. In the example of FIG. 7, the heel brace 710 is mounted to the rim 702 to provide structural strength to the rim 702 and secure the position of the heel brace 710 via the mounting rings 714A-B on each side of the heel brace 710.

Similar to the example of FIG. 6, the heel brace 710 of FIG. 7 contains holes for the elastomeric tubes 708 to pass through and corresponding notches 712 in the elastomeric tubes 708 to provide additional structural support for holding the elastomeric tubes 708 in place.

Figure 8:
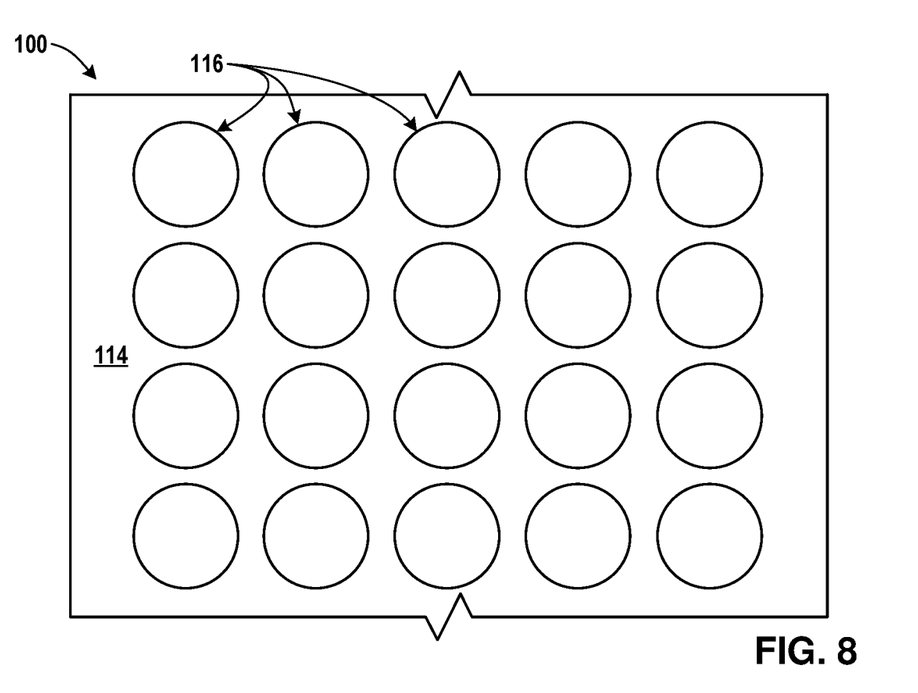
FIG. 8 sets forth a top view of the tread assembly of the airless tire of FIG. 1 according to embodiments of the present invention.

Turning now to FIG. 8, FIG. 8 sets forth a top view of the tread assembly of the airless tire 100 of FIG. 1 according to embodiments of the present invention. FIG. 8 depicts the elastomer base 114 and the elastomeric tubes 116 protruding from the surface of the elastomer base 114. In the example of FIG. 8, the elastomeric tubes 116 are solid and cylindrical in shape, but those of skill in the art will recognize that the shape of the elastomeric tubes 116 in the example of FIG. 8 is for example only and not for limitation. Moreover, the size of the elastomeric tubes 116 in the example of FIG. 1 and FIG. 8 and the spacing between the tubes 116 may depend on a variety of performance criterion. For example, the size and spacing of the elastomeric tubes useful in airless tires according to embodiments of the present invention affect how much surface area from the contact surface of the tubes touches the road surface, the coefficient of friction between the tire and the road surface, heat generation, tire wear, and so on. For many applications, however, a range of one-half of an inch to one and one-half of an inch would be suitable as the diameter of the elastomeric tubes 116 depicted in FIG. 8.

Figure 9:
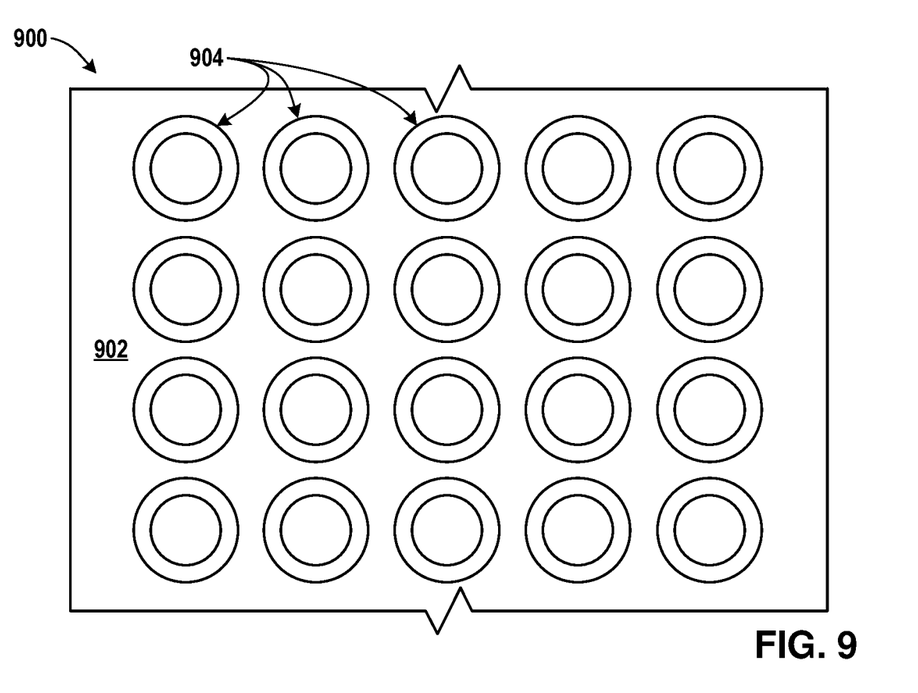
FIG. 9 sets forth a top view of the tread assembly of the airless tire according to embodiments of the present invention.

Turning now to FIG. 9, FIG. 9 sets forth a top view of the tread assembly of the airless tire 900 according to embodiments of the present invention. The tread assembly of FIG. 9 includes an elastomer base 902 and the elastomeric tubes 904 protruding from the surface of the elastomer base 902. In the example of FIG. 9, the elastomeric tubes 904 are hollow and cylindrical in shape, but those of skill in the art will recognize that this configuration is for example only and not limitation. As in the airless tire 100 of FIG. 8, the size of the elastomeric tubes 904 in the example of FIG. 9 and the spacing between the tubes 904 depend on a variety of performance criterion as discussed above. For many applications, however, a range of one-half of an inch to one and one-half of an inch would be suitable as the outer diameter of the elastomeric tubes 904 depicted in FIG. 9 and a range of one-quarter of an inch to one and one-quarter of an inch would be suitable as the inner diameter.

Figure 10:
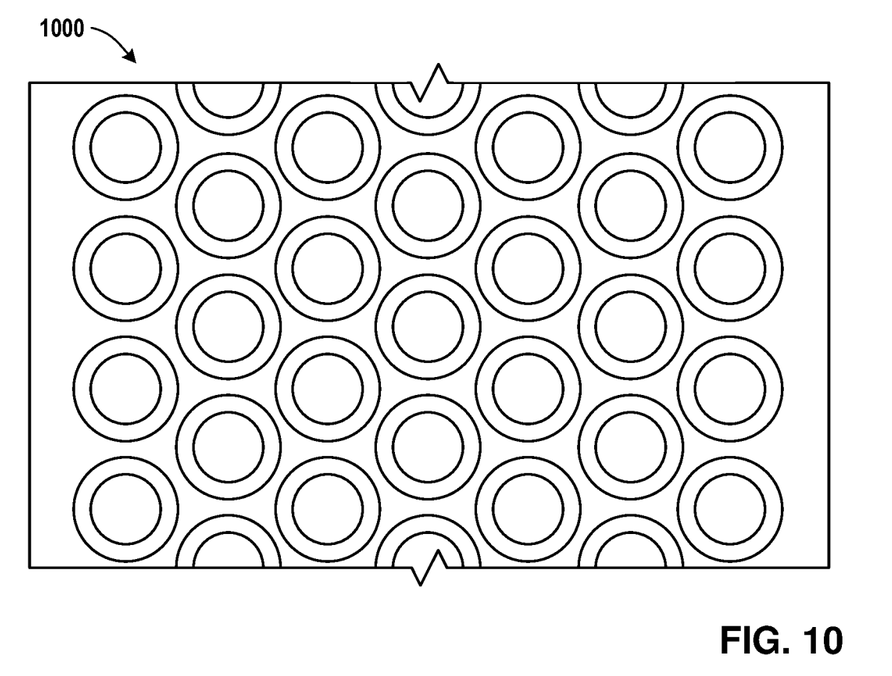
FIG. 10 sets forth a top view of the tread assembly of an airless tire according to embodiments of the present invention.
Figure 11:
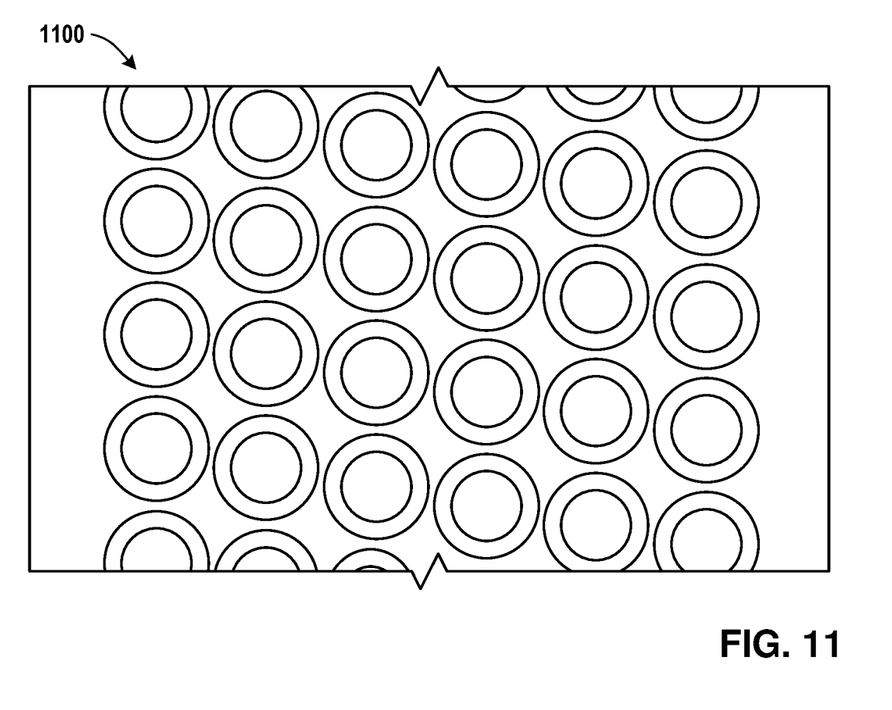
FIG. 11 sets forth a top view of the tread assembly of an airless tire according to embodiments of the present invention.

FIGS. 10 and 11 each set forth a top view of the tread assembly of an airless tire according to embodiments of the present invention. FIGS. 10 and 11 show two exemplary tread patterns 1000 and 1100 that may be useful in airless tires according to embodiments of the present invention.

The examples of FIG. 1-3 depict exemplary embodiments of the present invention that include a hub centered in the airless tire. Other embodiments of the present invention may also occur whereby the airless tire utilizes a centerless hub. The advantages associated with such centerless hubs are decreased weight, lower center of gravity, better braking leverage, and enhanced steering accuracy.

Figure 12:
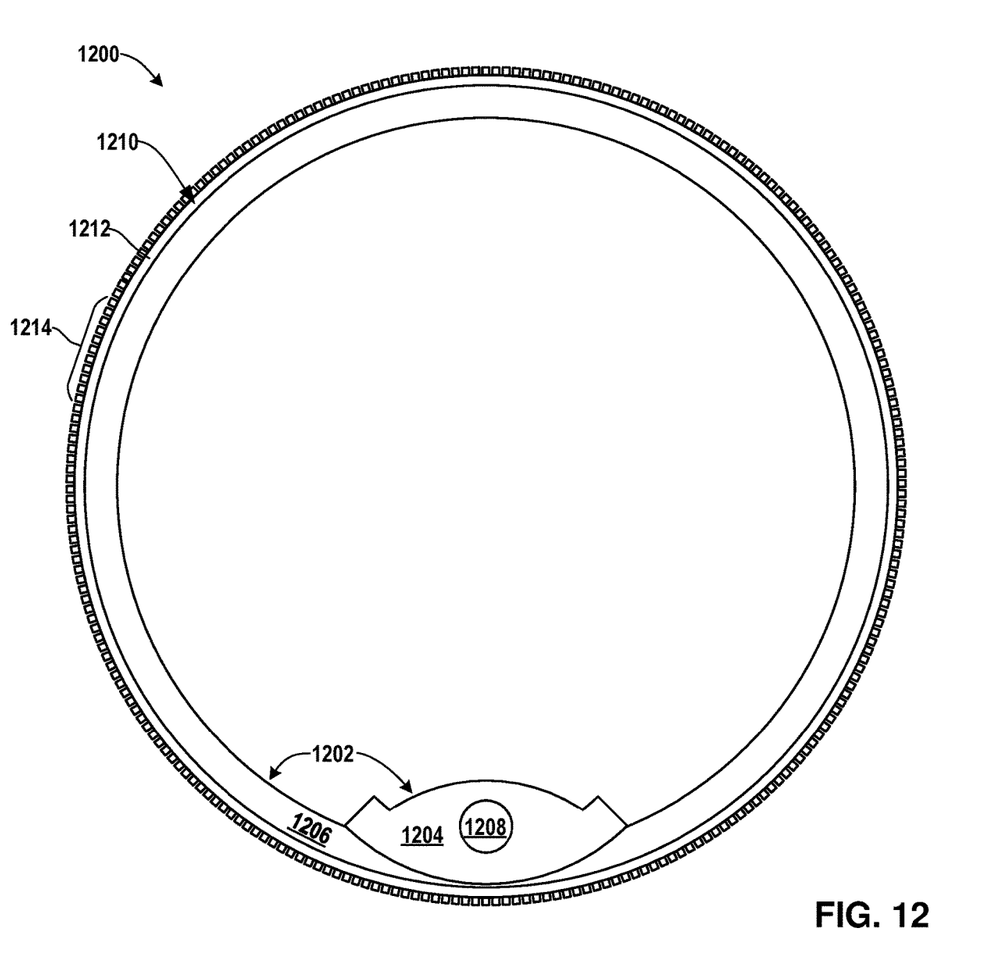
FIG. 12 sets forth a side view of an airless centerless tire according to embodiments of the present invention.

For further explanation of a centerless hubs, FIG. 12 sets forth a side view of an airless centerless tire 1200 according to embodiments of the present invention. The airless centerless tire 1200 of FIG. 12 is a tire without spokes or a central hub but rather has a centerless hub assembly 1202 similar in circumference to the entire tire 1200 itself. The centerless hub assembly 1202 of FIG. 12 includes a rim 1206 that serves as structural support for the heel 1210 and as a track or rail for the hub tractor interface 1204 configured to attach to an axle 1208.

The hub tractor interface 1204 of FIG. 12 uses gears to pull the hub tractor interface 1204 forward along the rim 1206. As the hub tractor interface 1204 moves forward along the rim 1206, the load weight applied to the hub tractor interface 1204 at the axle 1208 causes the rim 1206 to rotate and move forward as well—along with the entire to tire 1200.

The airless centerless tire 1200 of FIG. 12 also includes a heel 1210 configured around the centerless hub assembly 1202. The heel 1210 in the example of FIG. 12 includes an elastomer base 1212 oriented in a ring around a circumference of the centerless hub assembly 1202. The airless centerless tire 1200 of FIG. 12 also includes elastomeric tubes 1214 extending radially outward from the heel 1212.

The structure of the heel 1210, elastomer base 1212, and the elastomeric tubes 1214 of FIG. 12 is similar to the structure of those items as previously described.

The claimed subject matter has been provided here with reference to one or more features or embodiments. Those skilled in the art will recognize and appreciate that, despite the detailed nature of the exemplary embodiments provided here; changes and modifications may be applied to said embodiments without limiting or departing from the generally intended scope. These and various other adaptations and combinations of the embodiments provided here are within the scope of the disclosed subject matter as defined by the claims and their full set of equivalents.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An airless tire comprising:
    a hub configured for attachment to an axle;
    a hub support extending away from the hub, the hub support comprising a rim having a radially outward rim face, the radially outward rim face comprising a rim face opening;
    a heel configured around the hub and connected at a distal end of the hub support, the heel comprising an elastomer base oriented in a ring around a circumference of the hub support, wherein at least a portion of the heel protrudes through the rim face opening and at least a portion of the rim face extends axially over a portion of the heel; and
    a plurality of elastomeric tubes extending radially outward from the heel, wherein each of the plurality of elastomeric tubes comprises a first end face and a second end face, wherein each of the plurality of elastomeric tubes has a similar cross-section at the first end face and the second end face, the first end face and the second end face oriented such that each of the plurality of elastomeric tubes is aligned along a radial line extending from the hub and through the heel, wherein the second end face is a ground contacting surface, wherein a portion of the plurality of elastomeric tubes are submerged in the elastomer base.

2. The airless tire of claim 1 wherein the hub support further comprises spokes.

3. The airless tire of claim 1 wherein the hub support further comprises braces.

4. The airless tire of claim 1 wherein the hub support further comprises a disc.

5. The airless tire of claim 1 wherein the heel further comprises a heel brace embedded in the elastomer base.

6. The airless tire of claim 1 wherein the heel further comprises a metal support arch embedded in the elastomer base.

7. The airless tire of claim 1 wherein the plurality of elastomeric tubes further comprise solid tubes.

8. The airless tire of claim 1 wherein the plurality of elastomeric tubes further comprise hollow tubes.

9. The airless tire of claim 1 wherein:
    the heel further comprises a heel brace embedded in the elastomer base; and the plurality of elastomeric tubes are connected to the heel brace.

10. An airless tire comprising:

a hub configured for attachment to an axle;

a hub support extending away from the hub, the hub support comprising a rim having a radially outward rim face;

a heel configured around the hub and connected at a distal end of the hub support, the heel comprising an elastomer base oriented in a ring around a circumference of the hub support, wherein the heel further comprises a metal support arch embedded in the elastomer base, wherein the heel further comprises mounting rings around the circumference of the hub support, the mounting rings connected to a backside of the radially outward rim face, wherein the metal support arch connects to the mounting rings and is spaced apart from the radially outward rim face; and a plurality of elastomeric tubes extending radially outward from the heel, wherein each of the plurality of elastomeric tubes comprises a first end face and a second end face, wherein each of the plurality of elastomeric tubes has a similar cross-section at the first end face and the second end face, the first end face and the second end face oriented such that each of the plurality of elastomeric tubes is aligned along a radial line extending from the hub and through the heel, wherein the second end face is a ground contacting surface, wherein a portion of the plurality of elastomeric tubes are submerged in the elastomer base and connected to the metal support arch.

* * * * *